United States Patent
Wang et al.

(10) Patent No.: US 10,392,014 B2
(45) Date of Patent: Aug. 27, 2019

(54) SPEED CONTROLLER FOR A VEHICLE

(71) Applicant: Ford Global Technologies, LLC, Dearborn, MI (US)

(72) Inventors: Yan Wang, Ann Arbor, MI (US); Jing Wang, Canton, MI (US); Dimitar Petrov Filev, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 15/424,425

(22) Filed: Feb. 3, 2017

(65) Prior Publication Data
US 2018/0222477 A1   Aug. 9, 2018

(51) Int. Cl.
*B60W 30/14* (2006.01)
*B60W 50/00* (2006.01)

(52) U.S. Cl.
CPC ...... *B60W 30/143* (2013.01); *B60W 50/0097* (2013.01); *B60W 2050/0013* (2013.01); *B60W 2050/0014* (2013.01); *B60W 2550/12* (2013.01); *B60W 2550/142* (2013.01); *B60W 2550/146* (2013.01); *B60W 2550/147* (2013.01); *B60W 2550/22* (2013.01); *B60W 2550/30* (2013.01); *B60W 2550/40* (2013.01); *B60W 2720/103* (2013.01); *G05D 2201/0213* (2013.01)

(58) Field of Classification Search
CPC .......... B60W 30/143; B60W 50/0097; B60W 2050/0013; B60W 2050/0014; B60W 2550/12; B60W 2550/142; B60W 2550/146; B60W 2550/147; B60W 2550/22; B60W 2550/30; B60W 2550/40; B60W 2720/103; G05D 1/0276; G05D 2201/0213

USPC .......................................................... 701/23
See application file for complete search history.

(56) References Cited

U.S. PATENT DOCUMENTS

| 7,418,372 B2 | 8/2008 | Nishira et al. |
| 7,792,604 B2 | 9/2010 | Hong et al. |

(Continued)

FOREIGN PATENT DOCUMENTS

| EP | 2886410 A1 | 6/2015 |
| EP | 2955077 A1 | 12/2015 |

(Continued)

OTHER PUBLICATIONS

Nicolai Ommer, A Framework for Adaptive Feedfomard Motor-control for Unmanned Ground Vehicles , Technische Universitat Darmstadt, Sep. 15, 2016.

(Continued)

*Primary Examiner* — Aaron L Troost
*Assistant Examiner* — Paula L Schneider
(74) *Attorney, Agent, or Firm* — Frank Lollo; Neal, Gerber & Eisenberg LLP; James P. Muraff (57) ABSTRACT

Method and apparatus are disclosed for a speed controller for a vehicle. An example disclosed vehicle includes a power train control unit and an autonomy unit. The example power train control unit controls a speed of the vehicle based on a control signal. The example autonomy unit (a) receives a speed profile based on a preview of traffic information from an profile generator on an external network, and (b) based on vehicle dynamic data and the speed profile, generate the control signal to control the speed of the vehicle according to the speed profile.

13 Claims, 5 Drawing Sheets

(56) References Cited

U.S. PATENT DOCUMENTS

| | | | |
|---|---|---|---|
| 9,170,573 B2 | 10/2015 | Kihas | |
| 2011/0130964 A1 | 6/2011 | Kitagawa et al. | |
| 2014/0309833 A1* | 10/2014 | Ferguson | G05D 1/00 |
| | | | 701/23 |
| 2016/0096527 A1 | 4/2016 | D'Amato et al. | |
| 2016/0375768 A1* | 12/2016 | Konet | B60K 35/00 |
| | | | 348/148 |

FOREIGN PATENT DOCUMENTS

| | | | | |
|---|---|---|---|---|
| KR | 1020150137902 A | 12/2015 | | |
| WO | WO 2015/047177 | * | 4/2015 | B60W 30/165 |
| WO | WO 2015047177 A1 | 4/2015 | | |

OTHER PUBLICATIONS

Javad Marzbanrad & Iman Tahbaz-zadeh Moghaddam (2016) Self-tuning control algorithm design for vehicle adaptive cruise control system through real-time estimation of vehicle parameters and road grade, Vehicle System Dynamics, 54:9, 1291-1316, DOI: 10.1080/00423114.2016.1199886, http://dx.doi.org/10.1080/00423114.2016.1199886.

Zhenhua Huang, Xin Xu, Zhenping Sun, Jun Tuan, Lilin Qian, Speed Tracking Control via Online Continuous Actor-critic Learning , National University of Defense Technology, Changsha, China, Proceedings of the 35th Chinese Control Conference, (2016).

Search Report dated Jul. 19, 2018 for GB Patent Application No. GB 1801642.8 (4 pages).

* cited by examiner

SPEED CONTROLLER FOR A VEHICLE

TECHNICAL FIELD

The present disclosure generally relates to autonomous motive control of vehicles and, more specifically, a speed controller for a vehicle.

BACKGROUND

Increasingly, autonomous and semi-autonomous vehicles are being developed and deployed. Autonomous vehicles control the motive functions of the vehicle without direct input from a passenger. Semi-autonomous vehicles control some routine motive functions of the vehicle in certain conditions. For example, semi-autonomous vehicles may include parking assist, adaptive or cooperative cruise control, and/or highway assist, etc.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for a speed controller for a vehicle. An example disclosed vehicle includes a power train control unit and an autonomy unit. The example power train control unit controls a speed of the vehicle based on a control signal. The example autonomy unit (a) receives a speed profile based on a preview of traffic information from an profile generator on an external network, and (b) based on vehicle dynamic data and the speed profile, generate the control signal to control the speed of the vehicle according to the speed profile.

An example method to control an autonomous vehicle includes receiving a speed profile based on a preview of traffic information from a profile generator on an external network. The example method also includes, based on vehicle dynamic data and the speed profile, generating a control signal to control the speed of the vehicle according to the speed profile. Additionally, the example method includes controlling a speed of the vehicle based on the control signal via a power train control unit.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Some autonomous and semi-autonomous vehicles use feedforward and a proportional-integral-derivative (PID) feedback controller to control a throttle position and a brake signal. However, tuning the PID feedback controllers can be time consuming (e.g., when gain of the controller varies substantially with respect traffic, terrain, driving style, etc.). Additionally, the PID feedback controllers can be insensitive and/or not robust to changes in certain vehicle parameters (such as weight) that may require different feedforward tables as those parameter(s) fluctuate. Such systems can result in sluggish speed control of the autonomous and semi-autonomous vehicles.

As disclosed below, an autonomous or semi-autonomous vehicle has an autonomy unit with a speed controller. The speed controller uses a speed profile received from a profile generator running on a server on an external network. The speed profile is generated by using a location of the vehicle to retrieve preview data regarding conditions of the road ahead of the vehicle. The preview data includes, for example, general traffic information, traffic control signal information, speed limits, road grade, road curvature, road surface information, weather, visibility, road construction, specific data about traffic ahead of the vehicle, speed data from other vehicles, etc. Based on vehicle dynamic parameters (e.g., current speed, current acceleration, etc.) of the vehicle and the speed profile, the speed controller determines a throttle and/or brake signal value to control the speed of the vehicle. To determine the throttle and/or brake signal values, the speed controller (a) determines a vehicle model that correlates fuel consumption, a speed and/or an acceleration of the vehicle with the vehicle dynamic parameters and the speed profile, and (b) determines a state of the vehicle based on the vehicle constraint factors (e.g., speed tracking error, fuel consumption, brake wear, etc.), the model, the speed profile, and/or current positions of the brake and throttle positions. In some examples, the speed controller determines the vehicle model and the state of the vehicle every 100-200 milliseconds. In such a manner, the speed controller dynamically adapts to changes in certain vehicle parameters (e.g., fuel consumption as indicative of weight and road grade).

Figure 1:
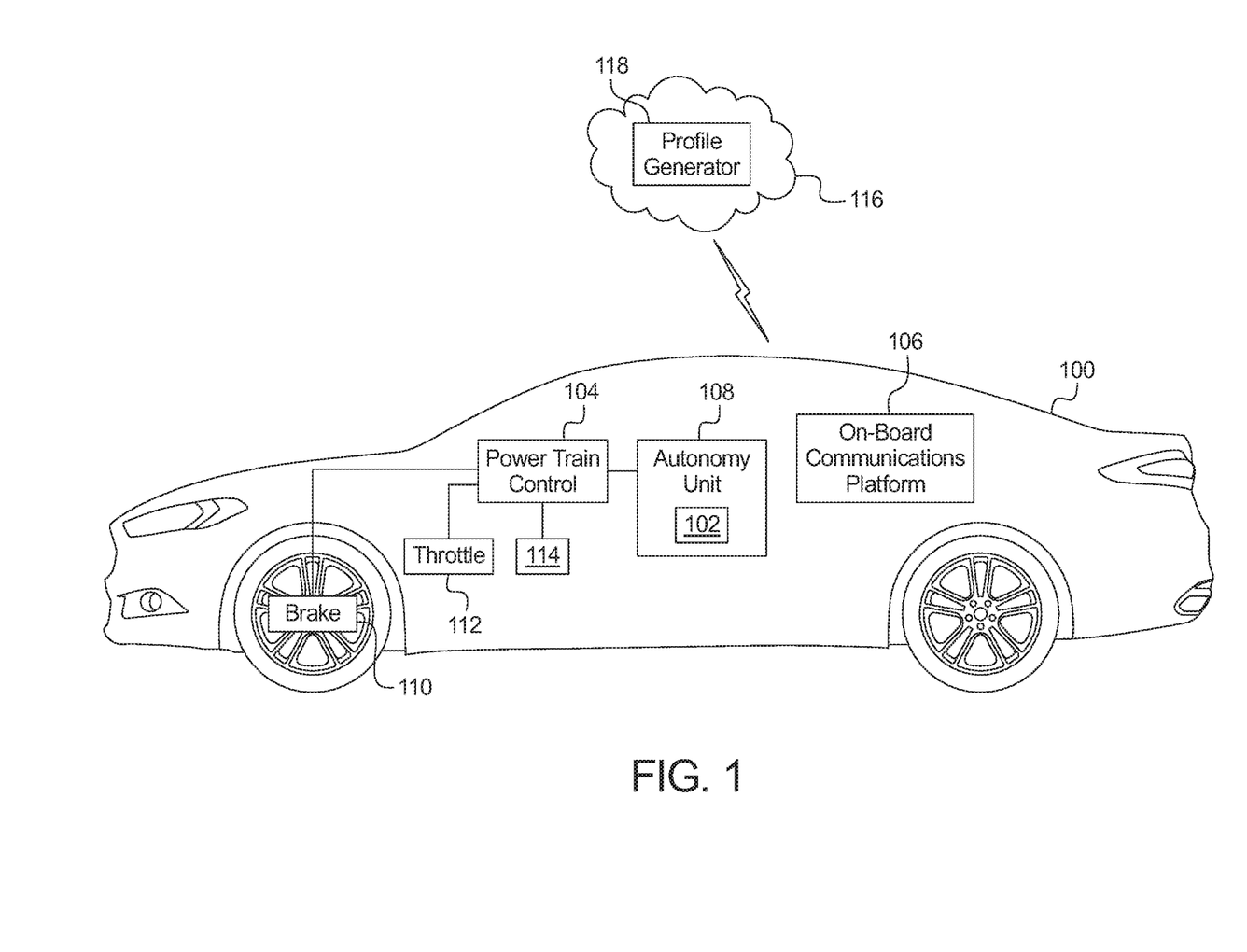
FIG. 1 illustrates a vehicle with a speed controller operating in accordance with the teachings of this disclosure.

FIG. 1 illustrates a vehicle 100 with a speed controller 102 operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be semi-autonomous (e.g., some routine motive functions controlled by the vehicle 100), or autonomous (e.g., motive functions are controlled by the vehicle 100 without direct driver input). For example, some autonomous vehicles do not include acceleration and brake pedals, and other autonomous vehicles include acceleration and brake pedals that are autonomously controlled via a robotic driver. In the illustrated example the vehicle 100 includes a power train control unit 104, an on-board communications platform 106 and an autonomy unit 108.

The power train control unit 104 monitors and controls subsystems of the vehicle 100, such as subsystems associated with an engine of the vehicle 100, a braking system, and a transmission system of the vehicle 100. power train control unit 104 includes a discrete set of electronics with circuit(s) (such as integrated circuits, microprocessors, memory, storage, etc.) and firmware, sensors, actuators, and/or mounting hardware. In the illustrated example, the power train control unit 104 is communicatively coupled to brakes 110 and a throttle 112 of the vehicle 100. The brakes 110 control deceleration of the vehicle 100. The throttle 112 controls the acceleration of the vehicle 100. By manipulating the position of the throttle 112 and the force applied by the brakes 110, the power train control unit 104 controls the speed of the vehicle 100.

In some examples, the power train control unit 104 receives a control signal (e.g., from the autonomy unit 108) to determine control of the brakes 110 and the throttle 112. In some such examples, the signal is bounded with a value between a negative value (e.g., negative one) and a positive value (e.g., positive one). In such examples, because applying the brakes 110 and opening the throttle 112 are mutually exclusive, the power train control unit 104 opens the throttle 112 when the control signal is positive and applies the brakes 110 when the control signal is negative. Additionally, the power train control unit 104 applies the brakes 110/opens the throttle 112 in proportion to the value of the signal (e.g., negative one is the brakes 110 fully applied, positive one is the throttle fully open).

The power train control unit 104 is communicatively coupled to sensors 114. The sensors 114 measure parameters of the vehicle 100. The parameters include fuel consumption (e.g., via a fuel gage sensors, etc.), a speed of the vehicle 100 (e.g., via a wheel speed sensor, etc.), and/or an acceleration of the vehicle 100 (e.g., via an accelerometer, etc.). The power train control unit 104 provides these measurements to other modules (e.g., the autonomy unit 108) within the vehicle 100.

The on-board communications platform 106 includes wired or wireless network interfaces to enable communication with external networks. The on-board communications platform 106 also includes hardware (e.g., processors, memory, storage, antenna, etc.) and software to control the wired or wireless network interfaces. In the illustrated example, the on-board communications platform 106 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, the on-board communications platform 106 includes a wired or wireless interface (e.g., an auxiliary port, a Universal Serial Bus (USB) port, a Bluetooth® wireless node, etc.) to communicatively couple with a mobile device (e.g., a smart phone, a smart watch, a tablet, etc.). Additionally, in some examples, the on-board communications platform 106 includes a global positioning system (GPS) receiver that provides the location of the vehicle 100.

The vehicle 100 communicates with the external network 116 via the on-board communications platform 106. In some examples, the vehicle 100 communicates with the external network 116 via the communication controller of the on-board communications platform 106. Alternatively, in some examples, the vehicle 100 communicates with the external network 116 via a mobile device coupled to the on-board communications platform 106. The external network 116 may be a public network, such as the Internet; a private network, such as an intranet; or combinations thereof, and may utilize a variety of networking protocols now available or later developed including, but not limited to, TCP/IP-based networking protocols.

In the illustrated example, the external network 116 includes a profile generator 118. In other examples, the vehicle 100 may include the profile generator 118. The profile generator 118 generates a speed control profile for the vehicle 100 based on the location of the vehicle 100. The speed control profile defines a target speed of the vehicle 100 over time. The profile generator 118 communicates with service providers, such as traffic providers (e.g., Waze®, MapQuest®, etc.), weather providers (e.g., Weather Underground, AccuWeather, etc.), map providers (e.g., Google Maps, Apple Maps, etc.), etc., to receive road parameter information (e.g., traffic information, traffic control information, weather information, road construction information, speed limit information, road grade and curvature information, road surface information, etc.) in the vicinity of the location of the vehicle 100. Based on the road parameter information, the profile generator 118 determines the target speed of the vehicle 100 to minimize fuel consumption, maintain traffic laws, and/or contribute to an orderly flow of traffic.

The autonomy unit 108 controls the autonomous features of the vehicle 100. When the vehicle 100 is autonomous, the autonomy unit 108 coordinates and controls the subsystems of the vehicle 100 to navigate without driver input. When the vehicle is semi-autonomous, the autonomy unit 108 controls the autonomous features of the vehicle 100 when the autonomous features (e.g., adaptive cruise control, lane centering, parking assistance, and highway assist, etc.) are activated by the driver and requirements for using the features are met. The autonomy unit 108 includes the speed controller 102.

Figure 2:
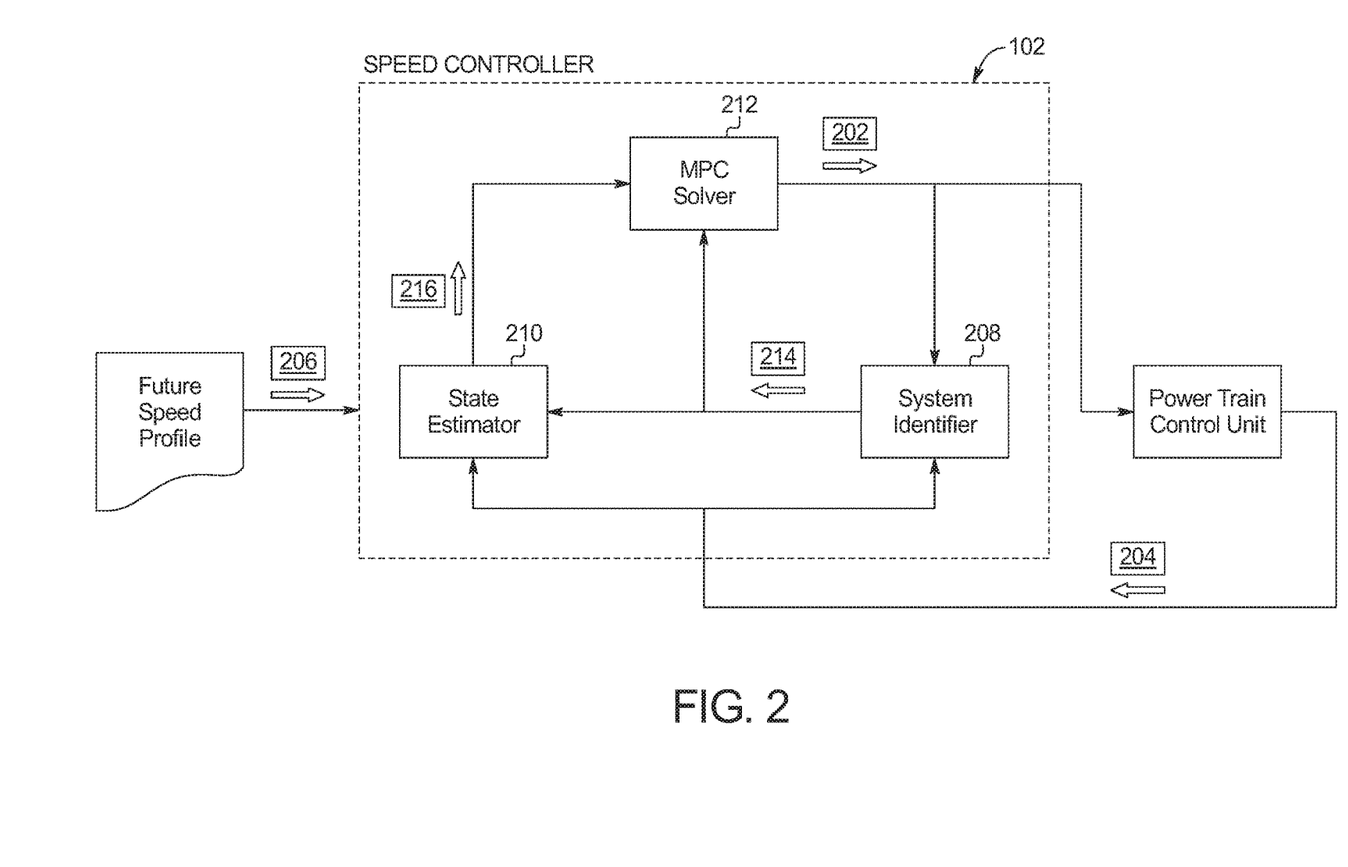
FIG. 2 is a block diagram of the speed controller of FIG. 1.

FIG. 2 is a block diagram of the speed controller 102 of FIG. 1. The speed controller 102 manages the speed of the vehicle 100 by frequently (e.g., every 100-200 milliseconds, etc.) sending a control signal 202 to the power train control unit 104. To generate the control signal 202, the speed controller 102 receives frequent updates (e.g., every 100-200 milliseconds, etc) of vehicle dynamic data 204 (e.g., the speed of the vehicle 100 and the acceleration of the vehicle 100) from the power train control unit 104 and a speed profile 206 from the profile generator 118 (via the on-board communications platform 106). The speed controller 102 receives the speed profile 206 from time-to-time (e.g., periodically, aperiodically). For example, the speed controller 102 may receive the speed profile 206 every thirty seconds, in response to the location of the vehicle 100 substantially changing, and/or when the road conditions (e.g., traffic, weather, etc.) have changed. The speed profile 206 includes the target speed for the vehicle 100 over time. In the illustrated example, the speed controller 102 includes an example system identifier 208, an example state estimator 210, and an example MPC solver 212.

Periodically, the example system identifier 208 identifies a mathematical model that captures the dynamic behavior of the vehicle 100 based on the vehicle dynamic data 204, the speed profile 206, and current positions of brake and throttle pedals of the vehicle 100. The system identifier 208 uses a second order multi input single output (MISO) autoregressive-moving-average (ARMAX) model in accordance with Equation (1) below to estimated state parameters 214 used to construct state space model.

$$y(k) = a_1 y(k-1) + a_2 y(k-2) + b_1^T u(k-1) + b_2^T u(k-2) + e(k) \quad \text{Equation (1)}$$

In Equation (1), y is the speed of the vehicle 100, k is the current instant of time, u is the control signal 202 provided to the power train control unit 104, and $a_1$, $a_2$, $b_1$, and $b_2$ are coefficients of the model. For example, if the current time k is 0 milliseconds, y(k) is the current speed at which to control the vehicle 100, y(k−1) is the speed at which the vehicle 100 was controlled 200 millisecond ago, y(k−2) is the speed at which the vehicle 100 was controlled 400 millisecond ago, u(k−1) is the control signal 202 provided to the power train control unit 104 200 milliseconds ago, and u(k−2) is the control signal 202 provided to the power train control unit 104 400 milliseconds ago. In other examples, the system identifier 208 uses a multi input multi output (MIMO) model in which an acceleration of the vehicle 100 is considered.

To estimate the state parameters 214, the system identifier 208 uses recursive (regularized) least square technique based on Equation (1) above. This results in estimating the state parameters 214. The system identifier 208 generates the state parameters 214 in accordance with Equation (2) below.

$$A = \begin{bmatrix} 0 & I \\ a_2 * I & a_2 * I \end{bmatrix}, B = \begin{bmatrix} 0 \\ I \end{bmatrix}, C = [b_2^T \ b_1^T] \quad \text{Equation (2)}$$

In Equation (2) above, A, B, and C are the state parameters 214, and I is an identity matrix.

The example state estimator 210 estimates internal states 216 of the state model based on the state parameters 214 provided by the system identifier 208, the control signal 202, and the vehicle dynamic data 204. In some examples, the state estimator 210 uses a Kalman Filter to estimate the internal state 216 of the system (e.g., x(k) and x(k+1)).

The MPC solver 212 uses the speed profile 206, the state parameters 214 and the internal state 216 to compute the value of the control signal 202. In some examples, the MPC solver 212 determines the control signal 202 in accordance with Equation (3) below.

for u(t)

minimize $\sum_{k=t}^{t+T} \{w_1 [y(k) - y_r(k)]^2 + w_2 u^2(k) + w_3 \|u(k) - u(k-1)\|^2\}$ subject to $x(k+1) = Ax(k) + Bu(k)$ $y(k) = Cx(k)$ $u_{min} \leq u(k) \leq u_{max}$ \quad Equation (3)

In Equation (3) above, y is the vehicle speed, $y_r$ is the target vehicle speed from the speed profile, T is a time horizon in which to account for, $w_1$, $w_2$, and $w_3$ are weights used to emphasize which constraint is prioritized, $u_{min}$ is the minimum value (e.g., negative one) for the control signal 202, and $u_{max}$ is the maximum value (e.g., positive one) for the control signal 202. A larger value of T accounts for more future target vehicle speeds (e.g., makes the speed controller 102 more forward looking). In some examples, T is equal to two. Increasing $w_1$ relative to $w_2$ and $w_3$ minimizes error between the current speed (y) and the target speed ($y_1$). Increasing $w_2$ relative to $w_1$ and $w_3$ minimizes break wear. Increasing $w_3$ relative to $w_1$ and $w_2$ minimizes differences or change between the previous control signal and the current control signal. The MPC solver 212 then provides the control signal 202 (u(t)) to the power train control unit 104.

Figure 3:
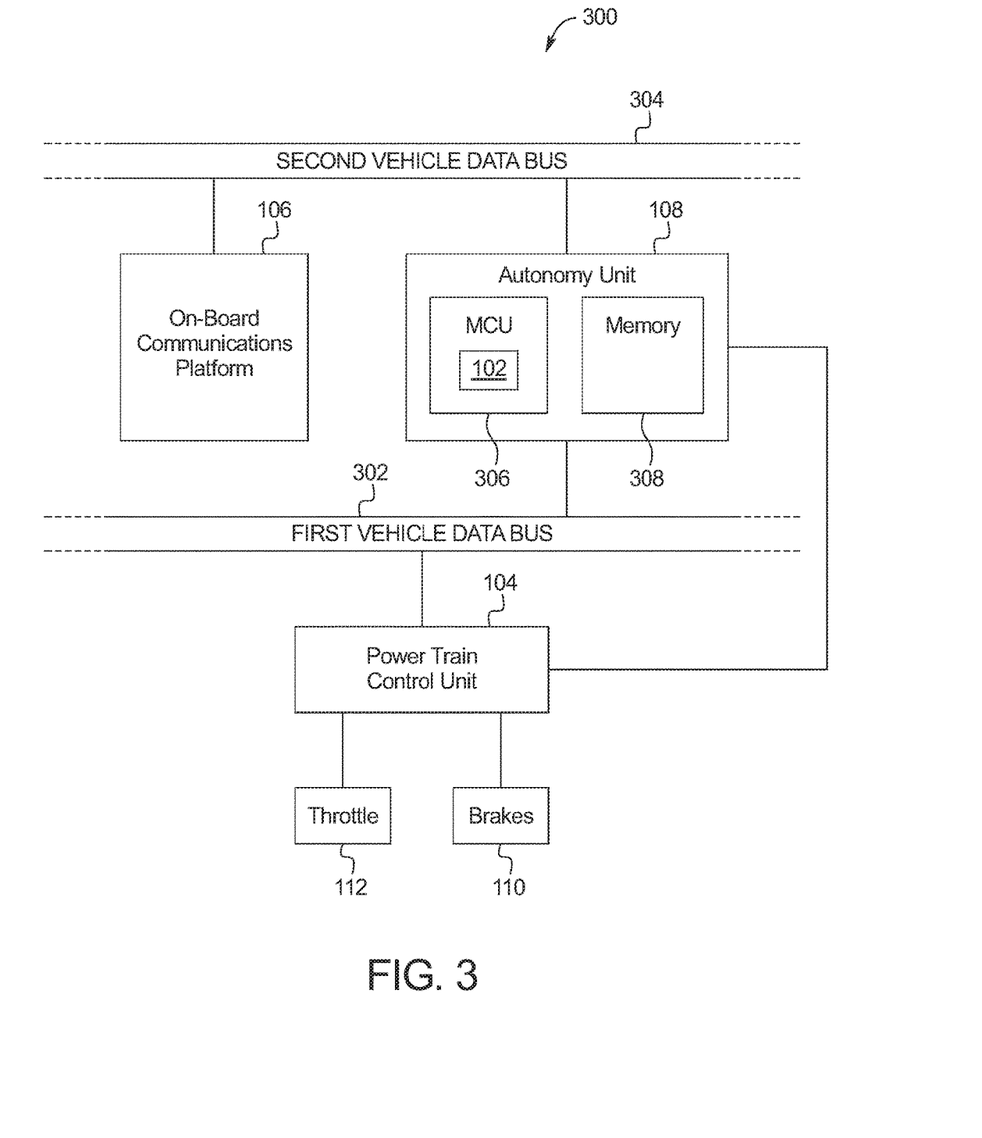
FIG. 3 is a block diagram of electronic components of the vehicle of FIG. 1.

FIG. 3 is a block diagram of electronic components 300 of the vehicle 100 of FIG. 1. In the illustrated example, the electronic components 300 include the power train control unit 104, the on-board communications platform 106, the autonomy unit 108, a first vehicle data bus 302, and a second vehicle data bus 304.

The autonomy unit 108 includes a processor or controller 306 and memory 308. In the illustrated example, the autonomy unit 108 is structured to include speed controller 102. Alternatively, in some examples, the speed controller 102 may be incorporated into another electronic control unit (ECU) with its own processor and memory. The processor or controller 306 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 308 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 308 includes multiple kinds of memory, particularly volatile memory and non-volatile memory.

The memory 308 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 308, the computer readable medium, and/or within the processor 306 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The first vehicle data bus 302 communicatively couples subsystems of the vehicle 100, such as the autonomy unit 108 and the power train control unit 104. In some examples, the first vehicle data bus 302 is implemented in accordance with the controller area network (CAN) bus protocol as defined by International Standards Organization (ISO) 11898-1. Alternatively, in some examples, the first vehicle data bus 302 may be a Media Oriented Systems Transport (MOST) bus, or a CAN flexible data (CAN-FD) bus (ISO 11898-7). The second vehicle data bus 304 communicatively couples subsystems of the vehicle 100, such as the autonomy unit 108 and the on-board communications platform 106. The second vehicle data bus 304 may be a MOST bus, a CAN-FD bus, or an Ethernet bus. In some examples, the second vehicle data bus 304 is isolated from the first vehicle data bus 302 (e.g., via firewalls, message brokers, etc.). Alternatively, in some examples, the first vehicle data bus 302 and the second vehicle data bus 304 are the same data bus.

Figure 4:
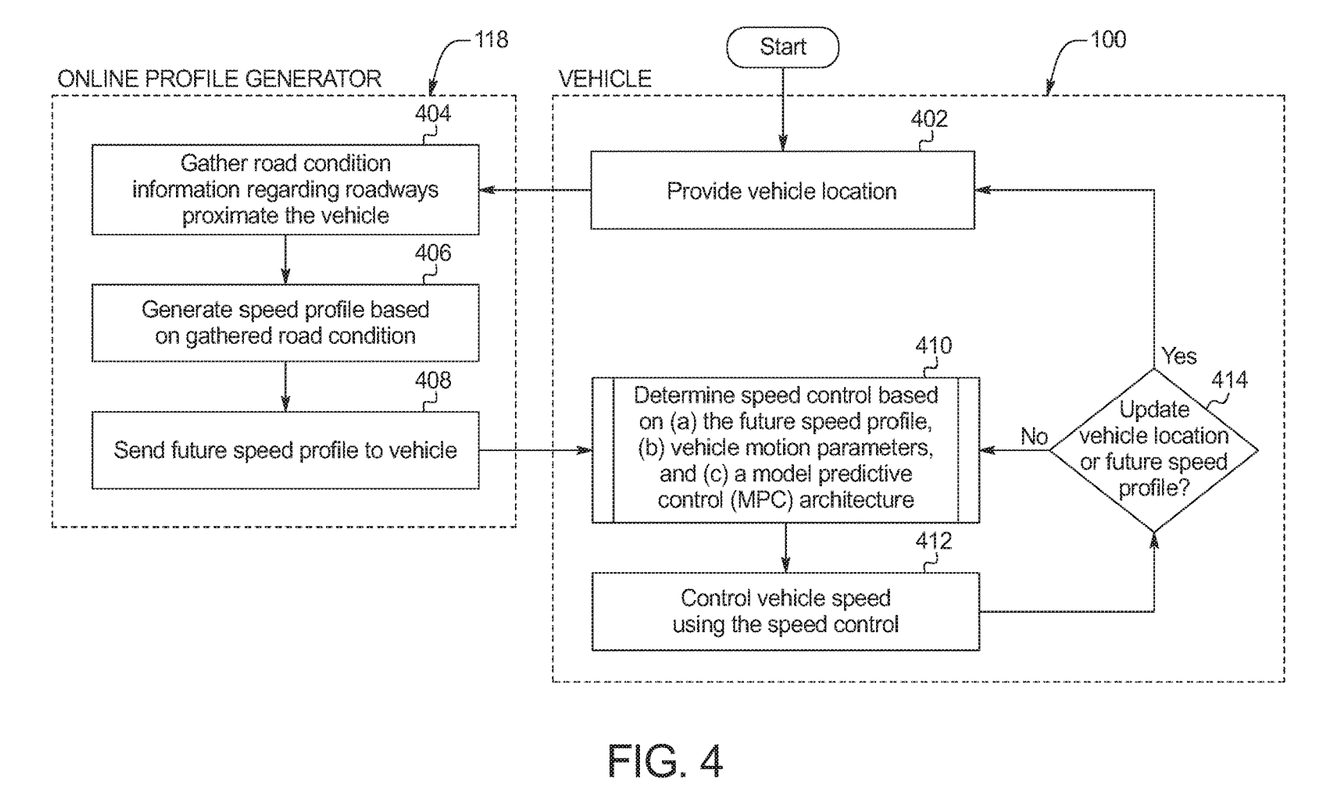
FIG. 4 is a flowchart of a method to control the speed of the vehicle of FIG. 1, which may be implemented by the electronic components of FIG. 3.

FIG. 4 is a flowchart of a method to control the speed of the vehicle 100 of FIG. 1, which may be implemented by the electronic components 300 of FIG. 3. Initially, at block 402, the speed controller 102 provides, via the on-board communications platform 106, the location (e.g., coordinates) of the vehicle 100 to the profile generator 118. At block 404, the profile generator 118 gathers road condition information (e.g., general traffic information, traffic control signal information, speed limits, road grade, road curvature, road surface information, weather, visibility, road construction, and/or specific data about traffic ahead of the vehicle, etc.) regarding roadways proximate the vehicle 100. At block 406, the profile generator 118 generates the speed profile 206 based on the road condition information gathered at block 404. The speed profile 206 includes target speeds (e.g., $y_r(0 \ldots t)$) for the vehicle 100 over a period of time (e.g., fifteen seconds, thirty seconds, etc.). At block 408, the profile generator 118 sends the speed profile 206 to the speed controller 102.

At block 410, the speed controller 102 determines the speed control signal 202 based on (a) the speed profile 206 received from the profile generator 118, (b) vehicle dynamic data 204 (e.g., the vehicle speed, the vehicle acceleration, etc.) and a model predictive control (MPC) architecture. An example method of determining the speed control signal 202 is disclosed in connection with FIGS. 5 and 6 below. At block 412, the power train control unit 104 controls the brakes 110 and the throttle 112 according to the speed control signal 202. At block 414, the speed controller 102 determines whether to update the location or speed profile 206. For example, the speed controller 102 may determine to update the location or speed profile 206 periodically (e.g., every one second, every two seconds, every fifteen seconds, every thirty seconds, etc.). If the speed controller 102 determines to update the location or speed profile 206, the method returns to block 402. Otherwise, if the speed controller 102 determines not to update the location or speed profile 206, the method returns to block 410.

Figure 5:
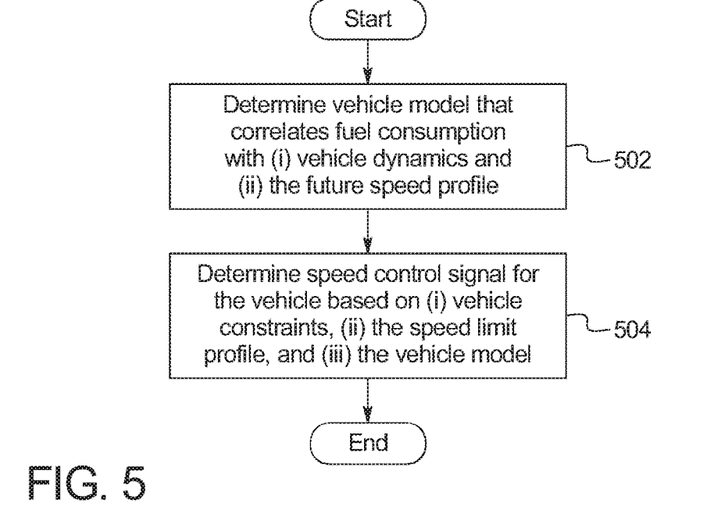
FIG. 5 is a flowchart of a method to determine a target speed of the vehicle of FIG. 1, which may be implemented by the electronic components of FIG. 3.

FIG. 5 is a flowchart of a method to determine a target speed of the vehicle 100 of FIG. 1, which may be implemented by the electronic components 300 of FIG. 3. Initially, at block 502, the speed controller 102 determines a vehicle model that correlates fuel consumption with (i) vehicle dynamic data 204 and (ii) the speed profile 206. At block 504, the speed controller determines the speed control signal 202 to control the brakes 110 and the throttle 112 of the vehicle 100 based on (i) vehicle constraint factors (e.g., minimizing difference or change between the target speed specified by the speed profile and the actual speed of the vehicle 100, minimizing brake wear, and/or minimizing sudden changes to the brakes 110 and the throttle 112).

Figure 6:
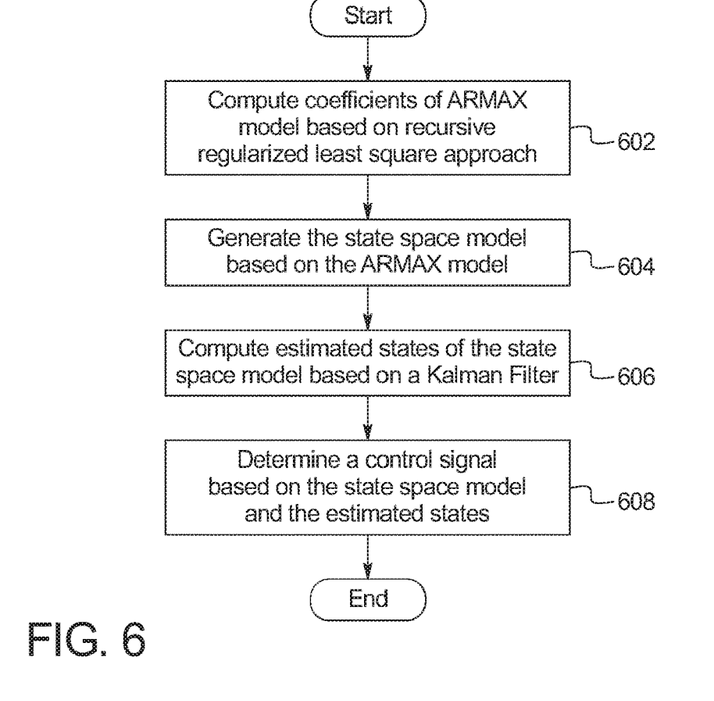
FIG. 6 is a flowchart of a method to determine pedal and brake positions to control the speed of the vehicle of FIG. 1, which may be implemented by the electronic components of FIG. 3.

FIG. 6 is a flowchart of a method to determine pedal and brake positions to control the speed of the vehicle 100 of FIG. 1, which may be implemented by the electronic components 300 of FIG. 3. Initially, at block 602, the system identifier 208 computer the state parameters 214 based on the coefficients of an ARMAX model using a regularized least square technique. At block 604, the system identifier 208 generates the state space model based on the ARMAX model. At block 606, the state estimator 210 computes estimated states (e.g., an estimated current state) of the state space model based on a Kalman Filter. At block 608, the MPC solver 212 determines the control signal based on the state space model and the estimated states (e.g., the estimated current state).

The flowcharts of FIGS. 4, 5, and 6 are representative of machine readable instructions stored in memory (such as the memory 308 of FIG. 3) that comprise one or more programs that, when executed by a processor (such as the processor 306 of FIG. 3), cause the vehicle 100 to implement the example speed controller 102 of FIGS. 1 and 2. Further, although the example program(s) is/are described with reference to the flowcharts illustrated in FIGS. 4, 5, and 6, many other methods of implementing the example speed controller 102 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a power train control unit to control a speed of the vehicle based on a control signal; and
   an autonomy unit with a processor configured to:
   receive a speed profile based on a preview of traffic information from a profile generator on an external network; and
   based on vehicle dynamic data and the speed profile, generate the control signal to control the speed of the vehicle according to the speed profile, wherein to generate the control signal, the autonomy unit is to:
   generate a model that correlates fuel consumption of the vehicle with the vehicle dynamic data and the speed profile; and
   determine the control signal based on vehicle constraint factors, the speed profile, and the model.

2. The vehicle of claim 1, wherein the vehicle constraint factors include at least one of minimizing error between target speeds specified by the speed profile, minimizing use of brakes of the vehicle, and minimizing change in the control signal.

3. The vehicle of claim 1, wherein the preview of traffic information includes information about conditions in a vicinity of the vehicle.

4. The vehicle of claim 3, wherein the preview of traffic information includes traffic information, traffic control signal information, speed limit information, road grade information, road curvature information, road surface information, weather information, visibility information, and road construction information.

5. The vehicle of claim 1, wherein the vehicle is an autonomous vehicle.

6. The vehicle of claim 1, wherein the autonomy unit is to generate the control signal every 100 milliseconds to 200 milliseconds.

7. A vehicle comprising:
a power train control unit to control a speed of the vehicle based on a control signal; and
an autonomy unit with a processor configured to:
receive a speed profile based on a preview of traffic information from a profile generator on an external network; and
based on vehicle dynamic data and the speed profile, generate the control signal to control the speed of the vehicle according to the speed profile, wherein to generate the control signal, the autonomy unit is to:
compute coefficients of an autoregressive-moving-average model using a recursive least square technique;
generate a state space model based on the coefficients of the autoregressive-moving-average model;
compute an estimated current state of the state space model using a Kalman Filter; and
determine the control signal based on the state space model, the estimated current state of the state space model, the speed profile, and the vehicle dynamic data.

8. A method to control an autonomous vehicle comprising:
receiving a speed profile based on a preview of traffic information;
generating a model that correlates fuel consumption with vehicle dynamic data and the speed profile;
determining the control signal based on vehicle constraint factors, the speed profile, and the model;
generating, with a processor, a control signal to control a speed; and
controlling, via a power train control unit, the speed based on the control signal.

9. The method of claim 8, wherein the vehicle constraint factors include at least one of minimizing error between target speeds specified by the speed profile, minimizing use of brakes of the autonomous vehicle, and minimizing change in the control signal.

10. The method of claim 8, wherein the preview of traffic information includes information about conditions in a vicinity of the autonomous vehicle.

11. The method of claim 10, wherein the preview of traffic information includes traffic information, traffic control signal information, speed limit information, road grade information, road curvature information, road surface information, weather information, visibility information, and road construction information.

12. The method of claim 8, wherein generating the control signal includes generating the control signal every 100 milliseconds to 200 milliseconds.

13. A method to control an autonomous vehicle, comprising:
receiving a speed profile based on a preview of traffic information from a profile generator on an external network;
computing coefficients of an autoregressive-moving-average model using a recursive least square technique;
generating a state space model based on the coefficients of the autoregressive-moving-average model;
computing an estimated current state of the state space model using a Kalman Filter; and
determining a control signal based on the state space model, the estimated current state of the state space model, the speed profile, and vehicle dynamic data;
generating, with a processor, the control signal to control a speed of the autonomous vehicle; and
controlling, via a power train control unit, the speed of the autonomous vehicle based on the control signal.

* * * * *